United States Patent Office 3,568,245
Patented Mar. 9, 1971

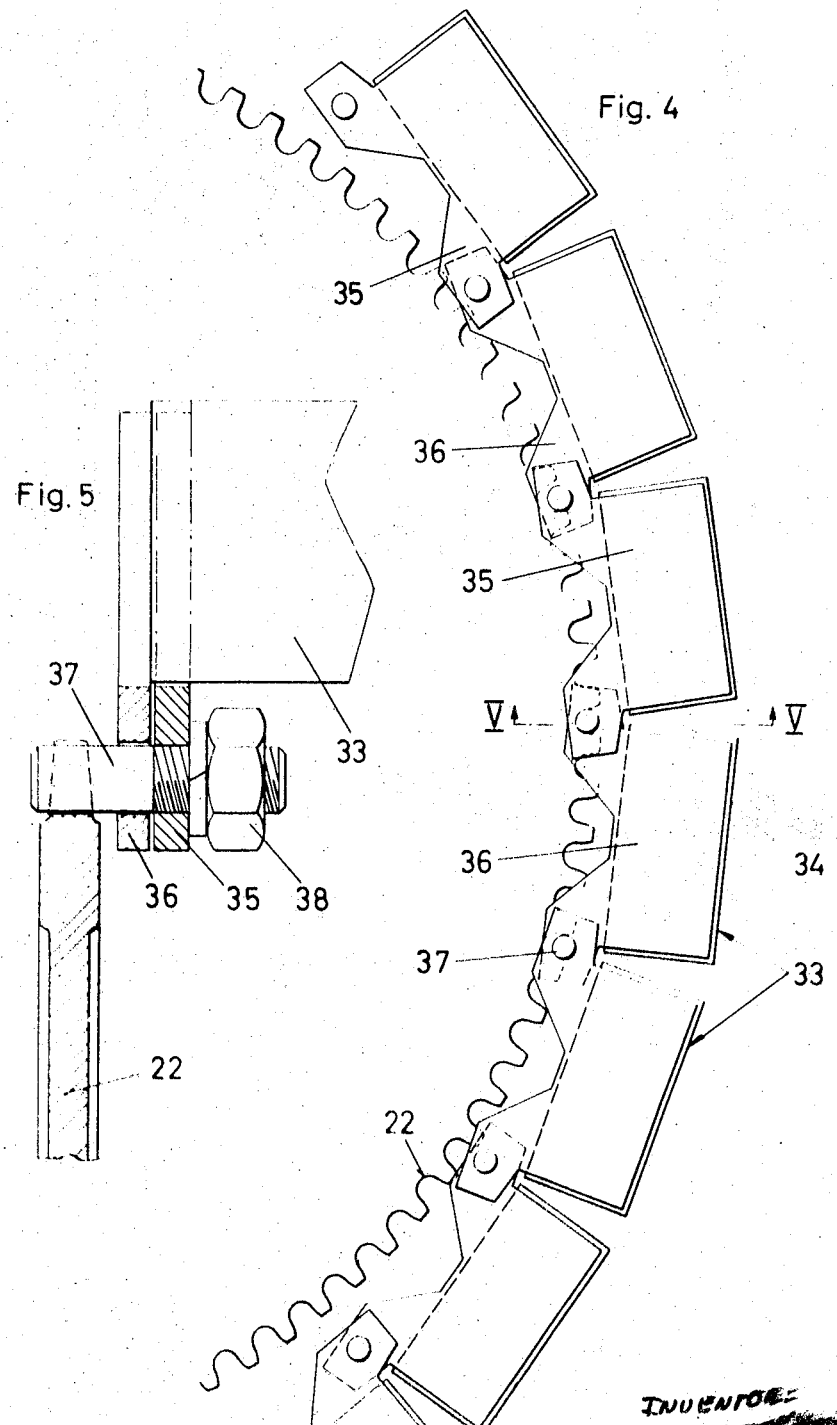

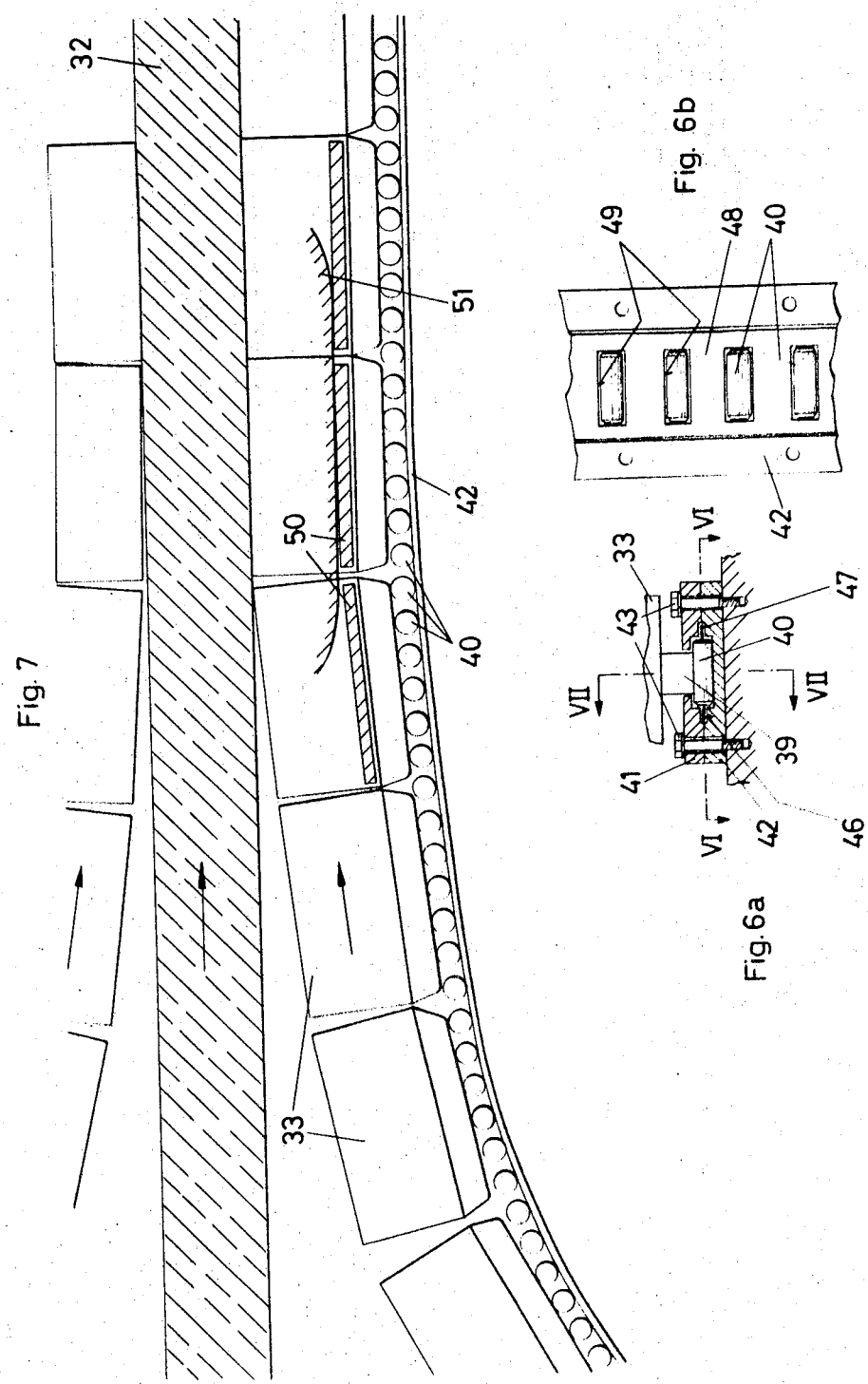

3,568,245
APPARATUS FOR MAKING COMPOSITION
PANELS
Raimund Jetzer, 13 Hohenweg,
5415 Nussbaumen, Switzerland
Filed July 24, 1968, Ser. No. 747,265
Claims priority, application Switzerland, July 24, 1967,
10,617/67
Int. Cl. B29c 15/00
U.S. Cl. 18—4       12 Claims

ABSTRACT OF THE DISCLOSURE

An apparatus for making composition panels consisting of solid constituents and initially flowable hardenable binding materials, comprises two endless belts arranged to be driven in mutually opposite directions and having spaced substantially coextensive facing stringers defining between themselves a gap through which a layer of the material advances with the binder in flowable state. The facing stringers of the belts exert pressure upon this layer from opposite sides thereof, and means is provided for varying this pressure. During travel through the gap the binder hardens and the layer issues at the downstream end of the gap as a solid panel.

BACKGROUND OF THE INVENTION

The present invention relates generally to the manufacture of composition panels and more particularly to a method of making such composition panels. The invention also relates to an apparatus for carrying out the method.

The term composition panels here refers to panels consisting of solid constituents and binders which harden but which are initially in flowable state. Such solid constituents may be wood chips, chips of other material, otherwise configurated particles of solid materials, sheets or layers of solid materials or the like. The binders may be of various different types, including hardenable synthetic resin material and the like. Panels of this type, and methods of and apparatus for making such panels are of course well known. However, heretofore it has been the practice to introduce quantities of the mixture which is to be formed and hardened into a solid composition panel into intermittently operated presses in which the quantity is subjected, in form of a layer, to pressure until the hardenable constituent has hardened sufficiently.

Presses suitable for this purpose are known in a variety of different types and constructions and they are fully capable of producing composition panels. They do, however, suffer from the disadvantage that their output is necessarily rather limited. Furthermore, they are relatively expensive and require significant economic and technical expenditure a factor which is made even more undesirable if one considers it in relation to the limited output of these presses. As a result, composition panels produced on such presses are relatively expensive although the nature of the materials used does not necessarily so dictate.

It is accordingly a general object of the present invention to provide for the improved manufacture of composition panels.

More particularly, it is an object of the present invention to provide a method of making composition panels wherein the manufacturing expenses are considerably reduced over what is known from the art.

A further object of the invention is to provide an apparatus capable of carrying out the present method.

SUMMARY OF THE INVENTION

In pursuance of these objects, and others which will become apparent hereafter, one feature of my invention resides in the provision of a method of making composite panels according to which a layer, consisting of at least one solid constituent and at least one hardenable binding constituent in flowable state, is advanced in a predetermined path. During such advancement a predetermined pressure is continuously exerted against opposite sides of the advancing layer for a period of time requisite for hardening of the flowable binding constituent. The result is a composition panel which is significantly less expensive to produce than what is heretofore known.

The invention is applicable to the manufacture of a variety of different types of composition panels, as has already been indicated above, including chip-board panels, flake-board panels, insulating panels, laminated panels, plywood panels and the like.

The invention also provides for an apparatus capable of carrying out the method and utilizing two endless belts having respective stringers which define between themselves a gap extending in the direction of the path of advancement of the layer to be treated, the belts travelling in mutually opposite directions and exerting the aforementioned pressure against opposite sides of the advancing layer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 is a fragmentary detail view of that portion outlined in FIG. 1 by the chain-line circle b and illustrated on an enlarged scale;

FIG. 5 is a section taken on the line V—V of FIG. 4;

FIG. 6a and 6b are fragmentary transverse sections and bottom-plan views, respectively, illustrating the support of the endless belts illustrated in the apparatus of FIG. 1; and FIG. 7 is a section on the line VII—VII of FIG. 6a, illustrating a detail of the apparatus in FIG. 1 which is outlined in that figure by the chain-line circle identified with reference numeral a.

DESCRIPTION OF THE PREFERRED EMBODIMENTS

Figure 1:
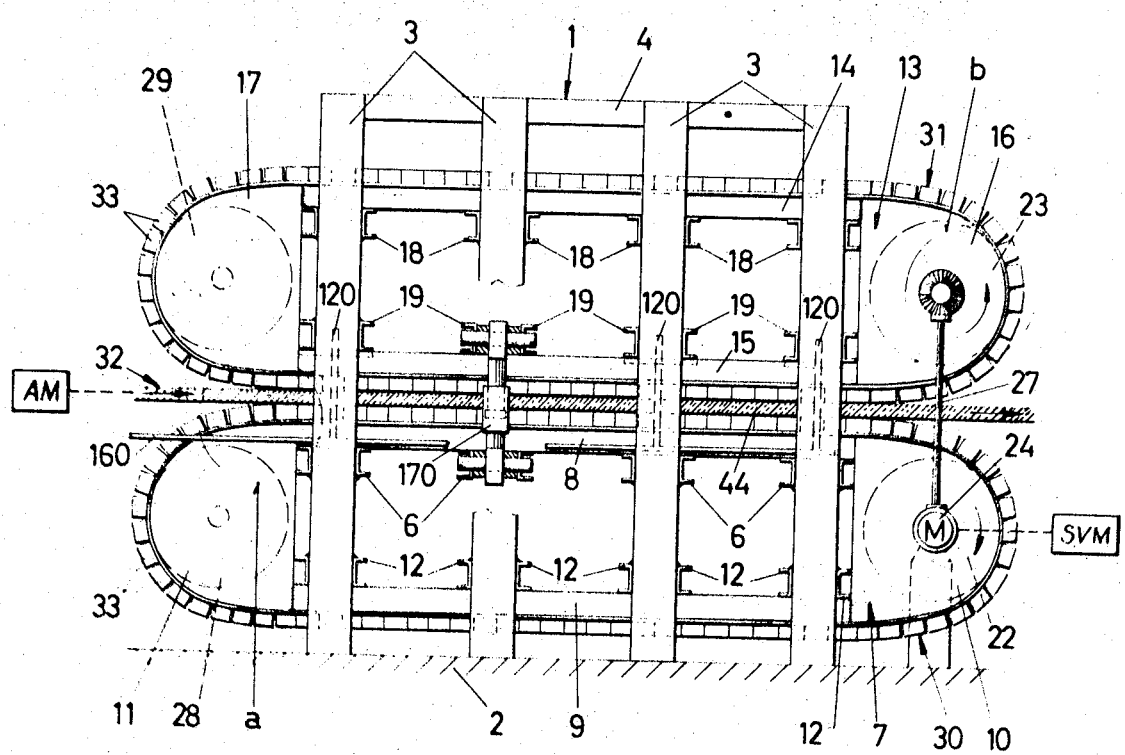
FIG. 1 is a side-elevational view of an apparatus according to the present invention, parts being broken away for clarity of illustration.

Discussing now the drawing in detail, it will be seen that my apparatus which I have illustrated herein by way of example and which is capable of carrying out my method, comprises a rigid support structure 1 which is firmly anchored in a suitable base 2. The support structure 1 comprises upright support members 3 which are arranged in two sets. One set is arranged with the upright support members 3 thereof spaced longitudinally from one another, and a second set is transversely spaced (compare FIG. 2) from the first set with each upright support member 3 of the second set being transversely opposite one of the first set. The support members 3 of the two sets are longitudinally and transversely connected by longitudinal support members and transverse support members 4 and 5, respectively, as is most clearly shown in FIG. 2. Further transverse support members 6 are provided which are also secured to the upright support members 3 and which further serve to brace the entire support structure 1.

Figure 2:
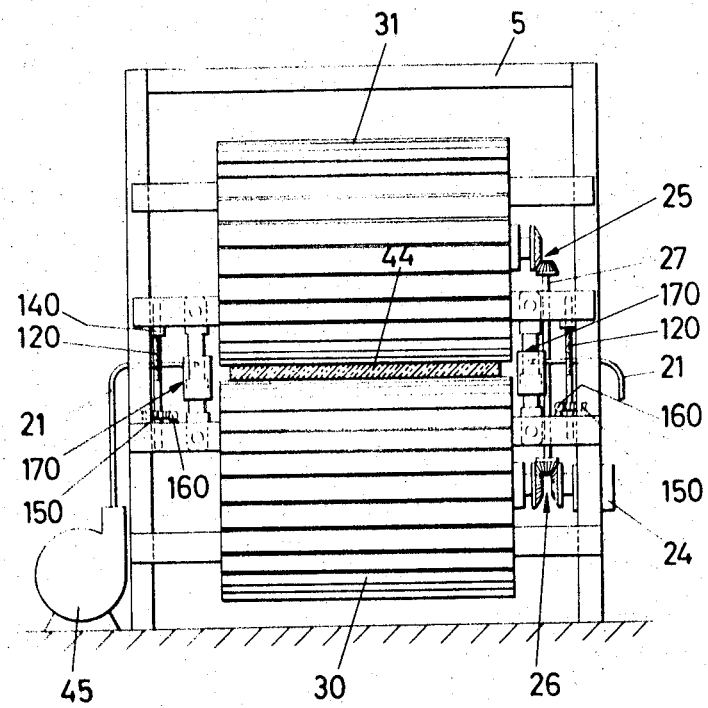
FIG. 2 is a front view of the apparatus shown in FIG. 1.

A lower supporting frame 7 is arranged within the confines of the two sets of upright support members 3. As is shown in FIGS. 1 and 2, particularly, the lower support frame 7 comprises an upper and a lower longitudinally extending support member 8 and 9 respectively. The end portions of the support members 8 and 9 are respectively connected with the bearing plates 10 and 11 so as to constitute therewith a rigid unit.

The upper longitudinally extending support member 8 is rigid with the transversely extending support members 6 and braced and reinforced by the same. The same function is performed for the lower support member 9 which is rigid with transversely extending members 12. It is clearly visible both in FIGS. 1 and 2 that the end portions of the transverse support members 6 and 12 extend laterally beyond the support members 8 and 9; these end portions of the transverse members 6 and 12 embrace the upright support members 3.

An upper supporting frame 13, constituting a counterpart to the lower supporting frame 7, is also located within the confines of the transversely spaced sets of upright support members 3, so as to be located above the lower support frame 7. The upper support frame 13 comprises longitudinally extending support members 14 and 15 whose end portions are also rigidly connected with bearing plates 16 and 17 which latter constitute with the longitudinally extending support members 14 and 15 a rigid unit. Transverse support members 18 and 19 serve to brace and reinforce the longitudinally extending support members 14 and 15 in the same manner as discussed above with respect to the transverse support members 6 and 12 in the lower support frame 7. Again, the end portions of the transverse support members 18 and 19 extend laterally beyond the longitudinally extending support members 14 and 15 and embrace the upright support members 3. They are not rigid with these upright support members 3 so that the upper support frame 13 is vertically movable with reference to the upright support members 3, with the embracing end portions of the transverse support members 18 and 19 serving as guides for this displacement. The lower support frame 7 is, however, stationary.

Figure 3:
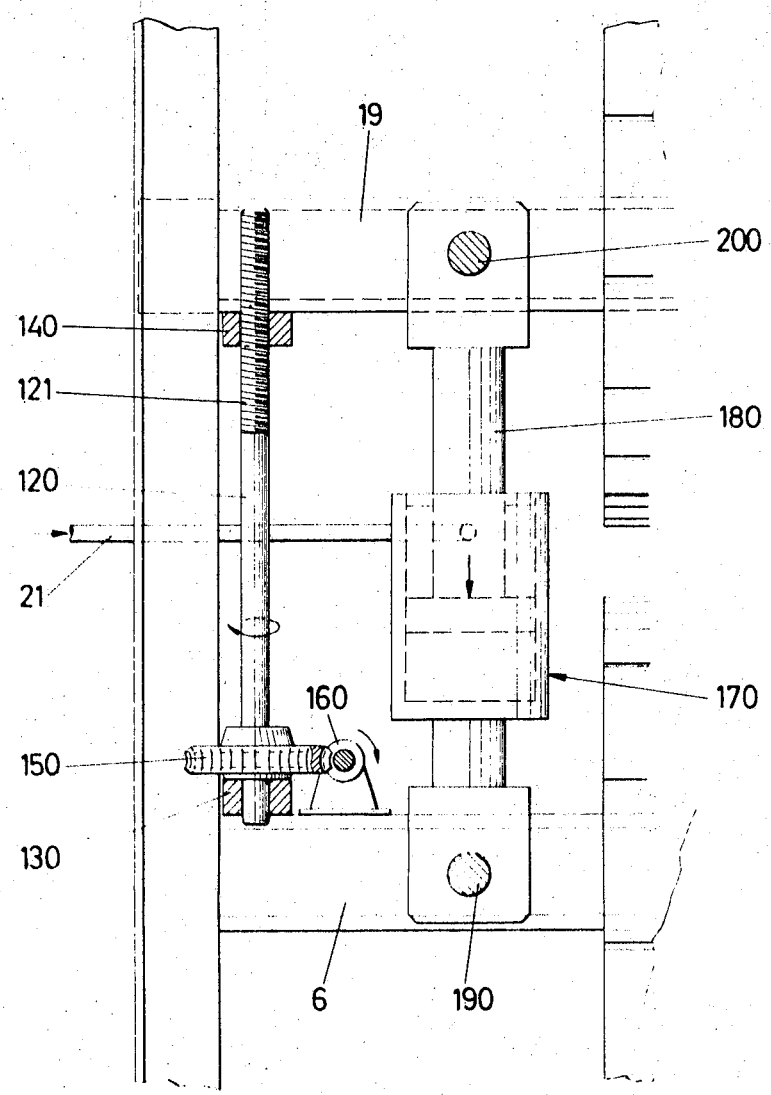
FIG. 3 is a fragmentary detail view of FIG. 2, shown on an enlarged scale.

As shown particularly in FIGS. 2 and 3, screw spindles 120 are provided which serve for adjusting the vertical position of the upper supporting frame 13. FIG. 3 shows especially clearly that the bottom end portion of each of the upright screw spindles 120 is turnably mounted in a support 130 which rests on the transverse support members 6, the latter being arranged in pairs as clearly shown in FIG. 1. The upper end portions 121 of the upright spindles 120 are screw threaded and are threadedly guided in a nut member 140 on which in turn the transverse support members 19 rest. The arrangement of the transverse support members 19 is in pairs, just as that of the transverse support members 6. It will be appreciated that a rotation of the respective screw spindles 120 in the direction indicated by the circular arrow in FIG. 3 will serve to move the transverse support members 19—and thereby the upper support frame 13—upwardly with reference to the transverse support members 6. Conversely, a turning of the screw spindle 120 in the direction oppositely the circular arrow will serve to lower the upper supporting frame 13. The turning of the screw spindles 120 is accomplished via a worm wheel 150 provided on and rigid with the end portion of each of the screw spindles 120, which worm wheel 150 cams with a cooperating worm gear 160 mounted on the transverse support members 6 and being driven by non-illustrated suitable drive means.

To provide for regulation of the pressure with which the endless belts 30 and 31 of the apparatus of FIG. 1 press upon the layer of material which is to be treated, which belts are mounted and driven in a manner still to be discussed, hydraulic cylinder and piston arrangements 170 are provided (compare FIG. 3). These arrangements have a cylinder and a piston rod 180. At the end of the cylinder facing away from the respective piston rod each of the arrangements 170 is articulately connected with the respectively associated pair of transverse support members 6 via a shaft or rod 190 which extends through the associated pair of transverse support members 6 and a connecting portion of the cylinder. The piston rod 180 of each cylinder extends upwardly so that its connecting portion is located between the two transverse support members 19 of an associated pair, with which it is articulately connected by means of a rod or shaft 200. A conduit 21 is provided which is connectable in suitable manner well known in the art and therefore not further discussed with a source of pressure fluid so that, when a pressure fluid is admitted to the respective arrangements 170 through the conduit 21 the upper support frame 13 is vertically shifted with respect to the lower one.

Returning now to FIG. 1 it will be seen that a first pair of driven supporting wheels 22 is located between the bearing plates 10 of which there are two which are transversely spaced from one another. A second pair of supporting wheels 23, also driven, is located between the similarly positioned bearing plates 16 which are associated with the upper supporting frame 13 as opposed to the bearing plates 10 which are associated with the lower supporting frame 7. Longitudinally spaced from the first pair of supporting wheels 22, and located between the pair of bearing plates 11, is a further pair of supporting wheels 28 and in similar manner there is an additional pair of supporting wheels 29 located between the bearing plates 17. All of the supporting wheels are illustrated in broken lines because they are not visible, being covered by the bearing plates. The supporting wheels 22, 23, which are of course turnable about their respective axes, are driven synchronously by a single motor 24, a drive shaft 27 and two sets of bevel gears 25 and 26 which respectively cooperate for driving the wheels 22 and 23. It is to be noted that the wheels 22 and 23 are rotated in mutually opposite directions as indicated by their associated arrows in FIG. 1.

A first endless pressing belt 30 is placed around and supported on the supporting wheels 22 and 28, and a second endless pressing belt 31 is similarly placed about and supported on the wheels 23 and 29. As the drawing shows, the bearing plates 10 and 11 on the one hand, and 16 and 17 on the other hand are of an approximately parabolic contour and so positioned that their respective apex is tangent to the periphery of the wheels 22, 28 and 23, 29, respectively. Each of the pressing belts 30 and 31 consists of a plurality of elongated presser elements 33 which are arranged extending transversely of the direction of travel of the respective belts 30 and 31 and in parallelism with one another. Due to the particular configuration of the bearing plates 10, 11, 16 and 17, the pressing belts 30 and 31 are guided away from the wheels 28 and 29 on passing over the same, and are guided at an increasing radius towards the layer 32 consisting of the material from which the composition panels are being made, and which layer advances through the gap between the facing stringers of the presser belts 30 and 31 in direction indicated by the arrows in FIG. 1. The pressing belts 30 and 31 slide over the bearing plates 10, 11 and 16, 17 respectively. Between the bearing plates 10, 11 and 16, 17 respectively and the pressing belts 30 and 31 are arranged bearings as illustrated in FIGS. 6a and 6b. This prevents a tilting of the individual presser elements 33 towards the layer 32 and possible damage thereof.

The particular construction of the presser elements 33 is more clearly shown in FIG. 4 where it will be seen that each presser element 33 consists of a presser member 34 and associated components which are still to be described. At the opposite end faces of the presser member 34, that is the laterally facing end faces thereof, there are provided chain-linked members 35, 36 which overlap one another and which are provided in their overlapping portions (see FIG. 5) with coaxially arranged openings through which a bolt 37 extends which is secured by a nut 38. The free portion of each bolt 37, that is the portion extending outwardly beyond the overlapping portions of the members 35, 36, engages with the teeth on the wheels 22, 23, 28 and 29. In FIG. 5 this is shown by way of example with respect to the wheel 22.

It will be appreciated that the presser elements 33 must be capable of withstanding strong pressures. Accordingly, they are supported on the longitudinally extending support members 8 and 9. How this is accomplished is shown in FIGS. 6a and 6b. In FIG. 6a it will be seen that there is illustrated a fragmentary longitudinal section through a presser element 33. A plurality of support members 39 are provided at the underside of the presser element 33, spaced over the longitudinal extension of the latter, the term underside referring to the remote face which faces away from the layer 32 when the respective presser element is in pressure-exerting engagement therewith. The support members 39 are supported on rollers 40 which advantageously consist of hardened steel and are mounted and guided in a cage which is rigid with the respective longitudinally extending support member 8 and 9. In the illustrated embodiment this cage consists of an upper and a lower strip 41 and 42, respectively, which are connected to one another and to the respective longitudinally extending support member 8 or 9 through the screws 43. The upper strip 41 is provided with a cut-out as illustrated, and the strips 41 and 42 together define with one another two parallel longitudinally extending undercut slots 46 and 47 in which there is guided for movement in longitudinal direction a steel ribbon 48. This ribbon 48, which is also shown in FIG. 6b, is provided with equidistantly spaced cut-outs 49 in which the rollers 40 are turnably arranged. Thus, when the pressing belts 30 and 31 advance in their predetermined directions, the rollers 40 turn and simultaneously shift with the ribbon 48 between these strips 41 and 42. It will be appreciated, of course, that depending upon the length of the respective presser elements 33, that is their dimension as seen in the direction transversely of the advancement of the layer 32 and the belts 30 and 31, a plurality of the support members 39 and the associated cages with the respective components thereof can be provided in parallelism.

The layer 32 is advanced by the diagrammatically illustrated advancing means AV which forms no part of the present invention and is indicated in FIG. 1 only for the sake of complete illustration. The speed of travel of the belts 30 and 31 in their respective directions of travel is advantageously regulated by means of the speed varying means SVM which is also diagrammatically illustrated in FIG. 1 and which does not form part of the invention. The speed of advancement of the belts 30 and 31, and accordingly of the layer 32 as the same enters into the gap between the facing stringers of the belts, is so selected that the binder material which is a constituent of the mass of which the layer 32 is composed will be hardened by the time the layer 32 issues from the gap between the facing stringers of the belts 30 and 31, so that the layer 32 issues in form of a completed composition panel at the downstream end of this gap.

It is advantageous to provide the exposed contact surfaces of the presser elements 33 with a coating, such as a foil or the like, of a self-lubricating type of synthetic plastic material, such as Teflon in order to protect the surface of the layer 32.

If it is necessary or desired to protect the surface of the layer 32 from impressions of the longitudinal edges of the presser elements 33, a guide arrangement may be provided of the type illustrated in FIG. 7. The illustration of FIG. 7 is rather diagrammatic and shown as it would appear in a section taken on the line VII—VII of FIG. 6a. In this guide arrangement the laterally directed end faces of the presser elements 33 are provided with projecting guide portions 50 which may be welded thereto. At the upstream or inlet end of the apparatus guide portions 51 of the type illustrated in FIG. 7 are provided in suitable manner, for instance by welding or the like, on the bearing plates 11 and 17, respectively, and it will be appreciated that the connection of the guide portions 51 with the bearing plates must be rigid. The cooperation between the projections 50 and the guide portions 51 is such that the presser elements 33 will always be guided into reliably flat contact with the surface of the layer 32. This is shown in FIG. 7 and it will be appreciated that the details of the configuration of the guide portions 51, and their arrangement and cooperation with the portions 50, will be readily evident to those skilled in the art.

The operation of the apparatus illustrated herein will be evident by now. Initially, the distance 44, that is the height of the gap between the facing stringers of the belts 30 and 31 (compare FIG. 2) is selected according to the desired thickness of the finished composition panel which is to be produced, by turning the screw spindles 120 in the requisite sense. Thereupon, pressure fluid is admitted from a source 45 of any known and suitable type compare FIG. 2) via the conduits 21 into the cylinder and piston arrangements 170 for selecting the pressure with which the facing stringers of the belts 30 and 31 will engage the opposite sides or surfaces of the advancing layer 32. The layer 32 is continuously advanced into the gap 44 and the hardenable constituent of the material of the layer 32 hardens during travel between the belts 30 and 31 while being simultaneously subjected to the requisite pressure by the facing stringers of these belts. The layer 32 then emerges at the downstream end of the gap 44 as a strip-shaped composition plate which can be cut into panels as desired. Of course, the width of this plate depends on the width of the apparatus shown in FIG. 1, as will be obvious, just as it will be clear that the length of panels into which this plate is severed can be selected at will. For this purpose suitable devices are known and are therefore not illustrated.

It will be understood that each of the elements described above, or two or more together, may also find a useful application in other types of constructions differing from the types described above.

While the invention has been illustrated and described as embodied in an apparatus for making composition panels, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an apparatus for making composition panels, the combination comprising advancing means for advancing in a predetermined path a layer consisting of at least one solid constituent and at least one hardenable binding constituent in flowable state; pressing means including a pair of endless belts disposed at opposite sides of a portion of said path and travelling in mutually opposite directions, each of said belts having a plurality of connected presser members extending transversely of the direction of travel of said belts, each of said presser members having a contact face for contacting said layer and a remote face facing away from said contact face, said pressing means being operative for continuously exerting against opposite major surfaces of the advancing layer a pressure of predetermined magnitude; support means including roller members for supporting the respective presser members at their remote faces; and varying means for varying the pressure exerted against said opposite sides, said binding constituent hardening during advancement of said layer in said portion of said path so that said layer emerges from said portion of said path as a solid composition panel.

2. In an apparatus as defined in claim 1, wherein said belts each have a stringer spaced from and facing the other belt and defining with the complementary stringer thereof a gap for passage of said layer, said stringers being coextensive with said portion of said path.

3. In an apparatus as defined in claim 2, wherein said presser members extend in parallelism with one another transversely of said portion of said path and of their respective direction of travel.

4. In an apparatus as defined in claim 3, said belts further comprising connecting means articulately connecting the presser members of the respective belt.

5. In an apparatus as defined in claim 2, said varying means comprising adjusting means for adjusting the distance between the facing stringers of said belts, and regulating means operative for regulating the pressure exerted upon said opposite sides of said layer and for maintaining such pressure constant.

6. In an apparatus as defined in claim 5, one of said belts being mounted for movement transversely of said path towards and away from the other belt; and wherein said regulating means comprises hydraulic cylinder and piston arrangements associated with said one belt and operative for urging the same towards the other belt to thereby exert a selectable pressure upon said advancing layer.

7. In an apparatus as defined in claim 2, said gap having an inlet and facing upstream of said portion of said path; and further comprising guide means associated with said belts and operative for guiding the respective stringers into engagement with the respective sides of the advancing layer at the inlet end of said gap and at an acute angle with respect to the general plane of said layer.

8. In an apparatus as defined in claim 7, said guide means comprising stationary guide portions provided adjacent said path and travelling guide portions provided on said belts and cooperating with said stationary guide portions so as to move into guiding engagement with the same in response to advancement of said belts in the respective direction of travel thereof.

9. In an apparatus as defined in claim 2, said pressing means further comprising drive means associated with said belts and operative for synchronously driving the same.

10. In an apparatus as defined in claim 9, said drive means including control means operative for varying the speed at which said belts travel in said mutually opposite directions.

11. In an apparatus as defined in claim 2, and further comprising foil means of self-lubricating synthetic plastic material provided on said contact surfaces.

12. In an apparatus as defined in claim 1, said support means including elongated stationary support members extending in direction of said path, and further comprising a plurality of steel strips each associated with said presser members extending along the same in direction of elongation of the respective belt at the respective remote faces of said presser members, said steel strips each being provided with a plurality of cut-outs and said roller means comprising roller members located between the respective steel strip and said stationary support members and each partially extending for rolling movement through one of said cut-outs into engagement with said remote faces, and said support means further comprising mounting means mounting the respective steel strips on one of said stationary support members with limited freedom of longitudinal shifting relative to the respective stationary support member in direction of elongation of the latter.

References Cited
UNITED STATES PATENTS

| | | | |
|---|---|---|---|
| 1,308,111 | 7/1919 | Porzel | 18—6E |
| 1,949,175 | 2/1934 | Netzel | 18—6E |
| 2,281,860 | 5/1942 | Renault | 18—4BUX |
| 2,488,446 | 11/1949 | Swiss | 18—Teflon Digest |
| 2,528,168 | 10/1950 | Paulsen | 18—6EX |
| 2,866,730 | 12/1958 | Potchen et al. | 18—4BUX |
| 3,065,500 | 11/1962 | Berner | 18—4B |
| 3,142,864 | 8/1964 | Pelley | 18—4B |
| 3,310,616 | 3/1967 | Beary | 18—4CUX |
| 3,313,010 | 8/1967 | Betz | 18—4BX |
| 3,422,178 | 1/1969 | Junker et al. | 18—4B |

FRANK T. YOST, Primary Examiner

U.S. Cl. X.R.

18—6